(12) United States Patent
Fujihara (10) Patent No.: US 8,447,927 B2
(45) Date of Patent: May 21, 2013

(54) STORAGE SYSTEM, CONTROL DEVICE AND STORAGE DEVICE

(75) Inventor: Takashi Fujihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 13/226,768

(22) Filed: Sep. 7, 2011

(65) Prior Publication Data
US 2012/0066451 A1 Mar. 15, 2012

(30) Foreign Application Priority Data
Sep. 13, 2010 (JP) .................................. 2010-204076

(51) Int. Cl.
*G06F 12/00* (2006.01)
(52) U.S. Cl.
USPC ........................................................ 711/114
(58) Field of Classification Search ........................ None
See application file for complete search history.

(56) References Cited

U.S. PATENT DOCUMENTS

| 2007/0177687 A1* | 8/2007 | Arima .......................... 375/262 |
| 2008/0209281 A1 | 8/2008 | Nagashima et al. |
| 2012/0095817 A1* | 4/2012 | Kamil et al. ................. 705/14.4 |

FOREIGN PATENT DOCUMENTS
JP   2008-217141   9/2008

* cited by examiner

*Primary Examiner* — Hiep Nguyen
(74) *Attorney, Agent, or Firm* — Staas & Halsey LLP (57) ABSTRACT

A storage system includes a storage device that includes a storage medium, and a control device that is connected to an upstream-side device, scans the storage device, writes the data in the storage device, and reads the data from the storage device, wherein the control device determines whether or not the data is being written in or read from the storage device, wherein when the data is being written or read, the control device scans the storage medium at intervals of a first time in a first direction that is either a direction in ascending order of logical block addresses of the storage medium or a direction in descending order of the logical block addresses of the storage medium, and wherein when the data is not written and read during the time period, the storage device scans the storage medium in a second direction.

11 Claims, 8 Drawing Sheets

| ITEM | DATA |
|---|---|
| 1 | POWER SUPPLY TIME |
| 2 | BMS STATUS |
| 3 | NUMBER OF TIMES OF SCAN |
| 4 | PROGRESS |
| 5 | BMS START LBA |
| 6 | REPLACEMENT PROCESS STATUS |
| 7 | ERROR SENSE CODE |
| 8 | ERROR LBA |

FIG. 3

| ITEM | DATA |
|---|---|
| 1 | MAX LBA |

FIG. 4

| ITEM | DATA |
|---|---|
| 1 | RAID DEVICE SCAN START LBA |
| 2 | COMMAND-SPECIFIED NUMBER OF BLOCKS |
| 3 | COMMAND-SPECIFIED LBA |
| 4 | NEXT SCAN START LBA |

STORAGE SYSTEM, CONTROL DEVICE AND STORAGE DEVICE

CROSS-REFERENCE TO RELATED APPLICATION

This application is based upon and claims the benefit of priority of the prior Japanese Patent Application No. 2010-204076, filed on Sep. 13, 2010, the entire contents of which are incorporated herein by reference.

FIELD

The present art relates to a storage system, a control device and a storage device.

BACKGROUND

With an increase in the capacity of a magnetic disk device, the capacity of a recent Redundant Arrays of Inexpensive Disks (RAID) device has increased. In order to ensure the quality of the magnetic disk device, the RAID device includes a disk patrol function of scanning the whole region of the magnetic disk device in accordance with a verify command in a process other than a normal I/O process.

Japanese Laid-open Patent Publication No. 2008-217141 is an example of the related art.

The conventional disk patrol function causes the RAID device to issue the verify command to the magnetic disk device of a RAID group at time intervals of 2 seconds in the process other than the normal I/O process and scans the whole region of the magnetic disk device.

In this case, when the capacity of the magnetic disk device is 1 TB, the scan needs to be performed for approximately 9 months. In addition, when the verify command is issued at time intervals of 2 seconds or less, the scan may be performed at a higher speed. However, the normal I/O process is adversely affected.

SUMMARY

According to an aspect of an invention, a storage system includes a storage device that includes a storage medium capable of storing data, and a control device that is connected to an upstream-side device, scans the storage device, writes the data in the storage device on the basis of a request provided from the upstream-side device, and reads the data from the storage device on the basis of a request provided from the upstream-side device, wherein the control device determines whether or not the data is being written in or read from the storage device on the basis of the interested request provided from the upstream-side device, and when the data is being written or read, scans the storage medium at intervals of a first time in a first direction that is either a direction in ascending order of logical block addresses of the storage medium or a direction in descending order of the logical block addresses of the storage medium, and wherein the storage device determines whether or not the data is written or read on the basis of the interested request provided from the upstream-side device during a time period from a time earlier by a second time than a current time to the current time, and when the data is not written and read during the time period, scans the storage medium in a second direction that is the reversed direction of the first direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
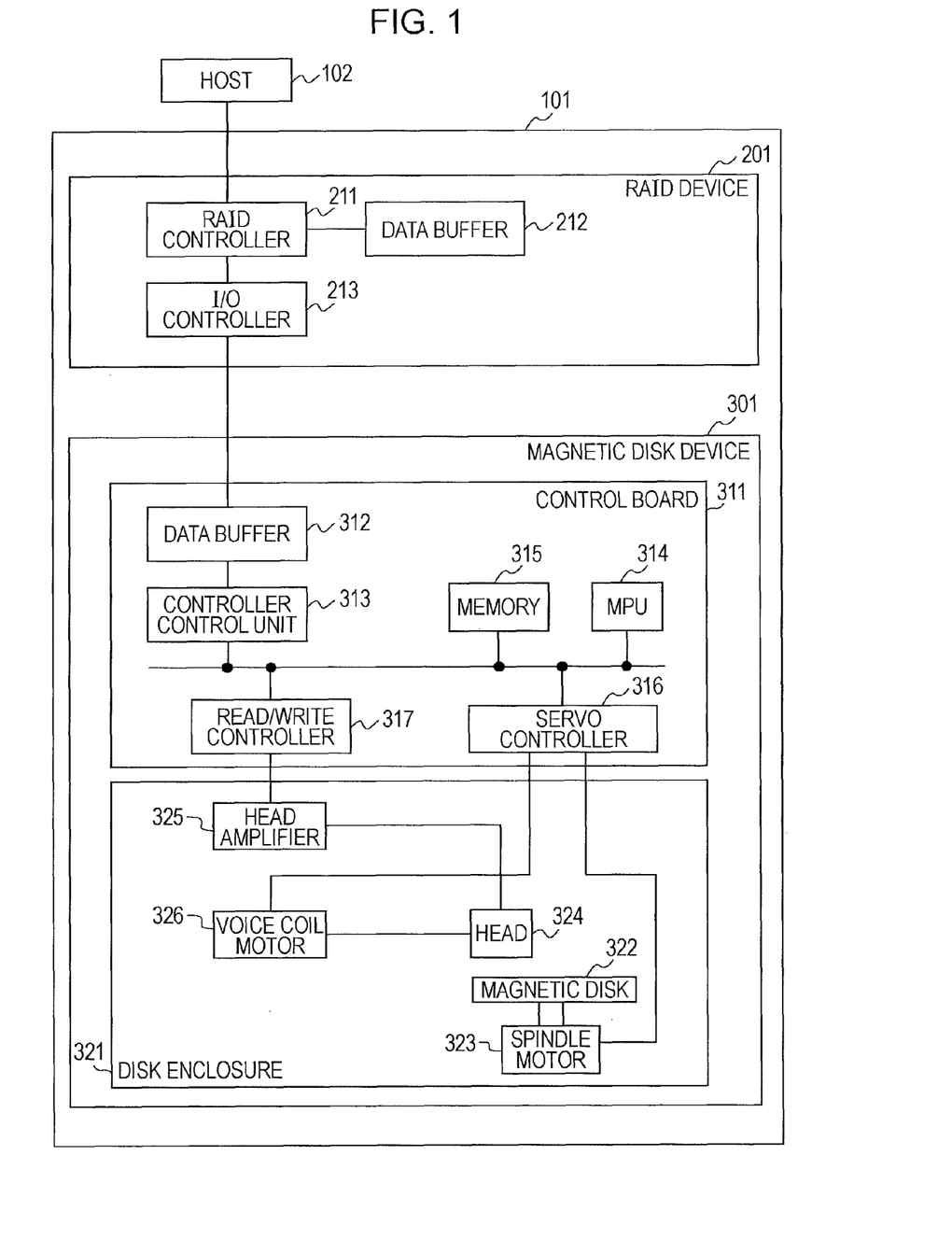
FIG. 1 is a diagram illustrating the configuration of a RAID system according to an embodiment.

An embodiment is described with reference to the accompanying drawings. FIG. 1 is a diagram illustrating the configuration of a RAID system according to the embodiment. The RAID system 101 includes a RAID device 201 and a magnetic disk device 301.

The RAID device 201 includes a RAID controller 211, a data buffer 212 and an I/O controller 213. The RAID device 201 is connected to a host (upstream-side device) 102. The host 102 requests the RAID device 201 to read and write data.

The RAID controller 211 performs various processes such as an instruction to issue a command. The data buffer 212 is a storage means for storing data (and the like) to be used by the RAID device 201.

The I/O controller 213 issues a command to the magnetic disk device 301 in accordance with the instruction of the RAID controller 211. The magnetic disk device 301 includes a control board 311 and a disk enclosure 321.

The control board 311 controls the magnetic disk device 301. The control board 311 includes a data buffer 312, a controller control unit 313, a micro processing unit (MPU) 314, a memory 315, a servo controller 316, and a read/write controller 317.

The data buffer 312 is a storage means for temporarily storing data received from the RAID device 201 and data to be transmitted to the RAID device 201. The controller control unit 313 executes the command received from the RAID device 201 and performs various processes such as background media scan (BMS).

The MPU 314 performs various processes such as positioning of a head 324 and a determination to be made whether or not read data is error data. The memory 315 is a storage means for storing setting data and firmware.

The servo controller 316 performs servo control on a spindle motor 323 and a voice coil motor 326. The read/write controller 317 controls writing of data in a magnetic disk 322 and reading of data from the magnetic disk 322.

The disk enclosure 321 is a chassis that houses the magnetic disk 322 and the like. The disk enclosure 321 houses therein the magnetic disk 322, the spindle motor 323, the head 324, a head amplifier 325, and the voice coil motor 326.

The magnetic disk 322 is a storage medium for storing information. For example, the magnetic disk 322 is a metal disk formed by coating or depositing a magnetic material. The spindle motor 323 is a motor for rotating the magnetic disk 322 and is controlled by the servo controller 316.

The head 324 writes data in the magnetic disk 322 and reads data from the magnetic disk 322. The head amplifier 325 amplifies a data signal to be written in the magnetic disk 322 and a data signal read from the magnetic disk 322.

The voice coil motor 326 moves the head 324 so that the head 324 is placed at a predetermined position above the magnetic disk 322. In the present embodiment, the magnetic disk device 301 is used as a storage device. However, an optical disc device and a semiconductor storage device may be used instead of the magnetic disk 301.

Figure 2:
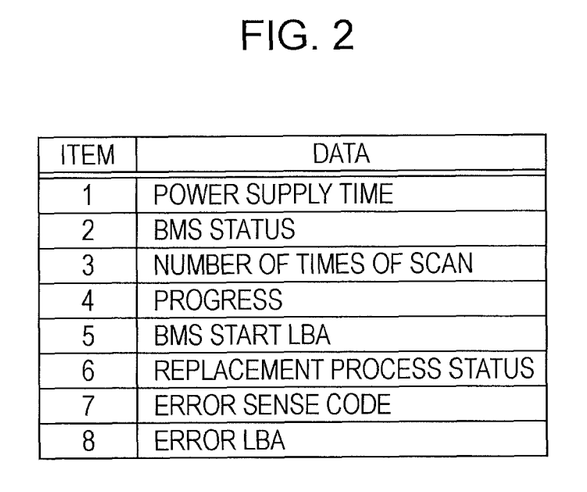
FIG. 2 is a diagram illustrating an example of a BMS log table.

FIG. 2 is a diagram illustrating an example of a BMS log table. A power supply time, a BMS status, the number of times of scan, a progress, a BMS start LBA, a replacement process status, an error sense code, and an error LBA are described in the BMS log table.

The BMS log table is stored in the magnetic disk 322. The power supply time is a time when power is supplied to the magnetic disk device 301. The BMS status is the status (for example, an executed status, a normally terminated status, an erroneously terminated status, or the like) of the BMS.

The number of times of scan is the number of times of performed scan. The progress is the progress of scan. The BMS start LBA is a logical block address (LBA) that is a start point at which the next scan starts to be performed. The BMS start LBA may be an LBA that is an end point at which the current scan is completed.

The replacement process status indicates whether or not a replacement process has been performed in an error process. The error sense code is an error sense code that indicates an error. The error LBA is an LBA of a location at which the error is detected.

Figure 3:
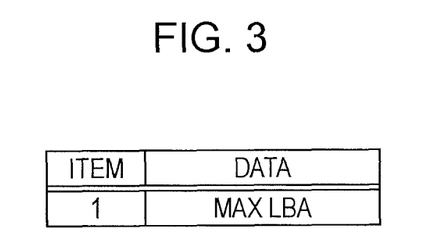
FIG. 3 is a diagram illustrating an example of a MAX LBA table.

FIG. 3 is a diagram illustrating an example of a MAX LBA table. The MAX LBA table is stored in the data buffer 212. A MAX LBA is described in the MAX LBA table. The MAX LBA is the maximum value of LBAs of the magnetic disk device 301.

Figure 4:
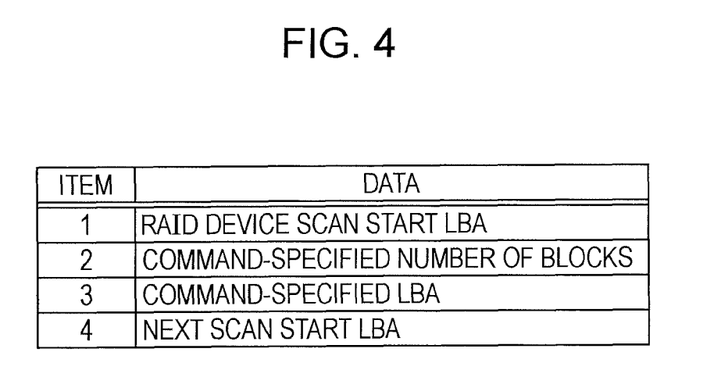
FIG. 4 is a diagram illustrating an example of a RAID start LBA table.

FIG. 4 is a diagram illustrating an example of a RAID start LBA table. The RAID start LBA table is stored in the data buffer 212. A RAID device scan start LBA, a command-specified number of blocks, a command-specified LBA, and a next scan start LBA are described in the RAID start LBA table. The RAID device scan start LBA is an LBA that is used to calculate a start point at which the next scan starts to be performed. The RAID device scan start LBA may be an LBA that is an end point at which the current scan is completed.

The command-specified number of blocks is the number of blocks on which the scan is performed one time. The command-specified LBA is an LBA that is a start point at which the next scan starts to be performed. The command-specified LBA is a value of (RAID device scan start LBA−command-specified number of blocks+1). The next scan start LBA is a RAID device scan start LBA at which the next scan starts to be performed. The next scan start LBA is a value obtained by subtracting 1 from the command-specified LBA.

Figure 5:
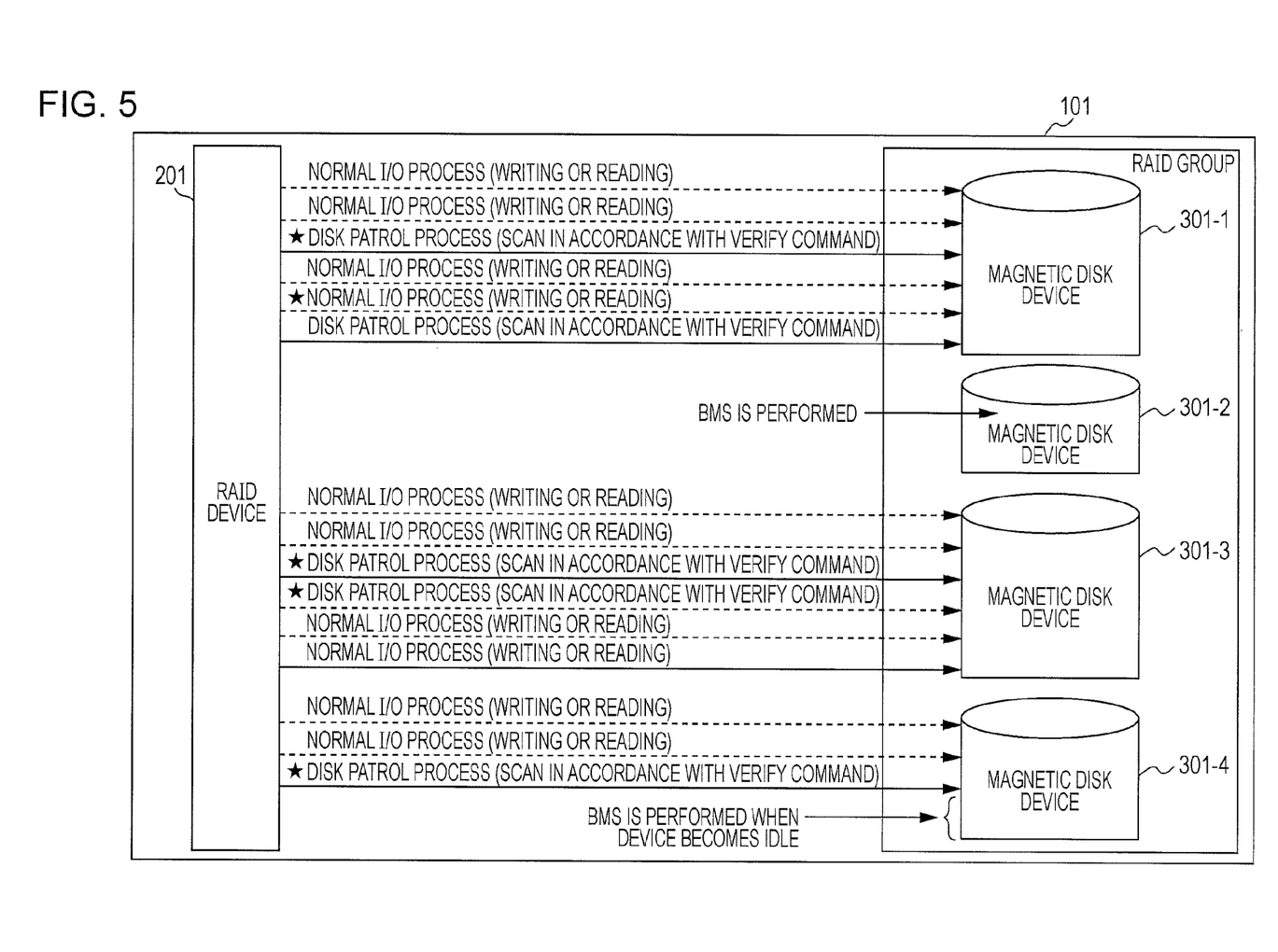
FIG. 5 is a diagram illustrating operations of the RAID system according to the embodiment.

FIG. 5 is a diagram illustrating operations of the RAID system according to the embodiment. The RAID system 101 illustrated in FIG. 5 includes four magnetic disk devices 301-$n$ ($n=1$ to 4). The four magnetic disk devices 301-$n$ form a single RAID group. A normal I/O process (writing or reading) and a disk patrol process (scan to be performed in accordance with issuance of a verify command) are performed on the magnetic disk devices 301-1 and 301-3. In this case, the disk patrol process is performed at intervals of 2 seconds. The scan to be performed in accordance with the issuance of the verify command is called scan to be performed in accordance with an I/O.

The normal I/O process is not performed on the magnetic disk device 301-2. Thus, the magnetic disk device 301-2 is idle and the BMS is performed on the magnetic disk device 301-2. After the normal I/O process is performed on the magnetic disk device 301-4, the disk patrol process is performed on the magnetic disk device 301-4. After that, the normal I/O process is not performed on the magnetic disk device 301-4. Thus, the magnetic disk device 301-4 becomes idle, and the BMS is performed on the magnetic disk device 301-4.

Figure 6:
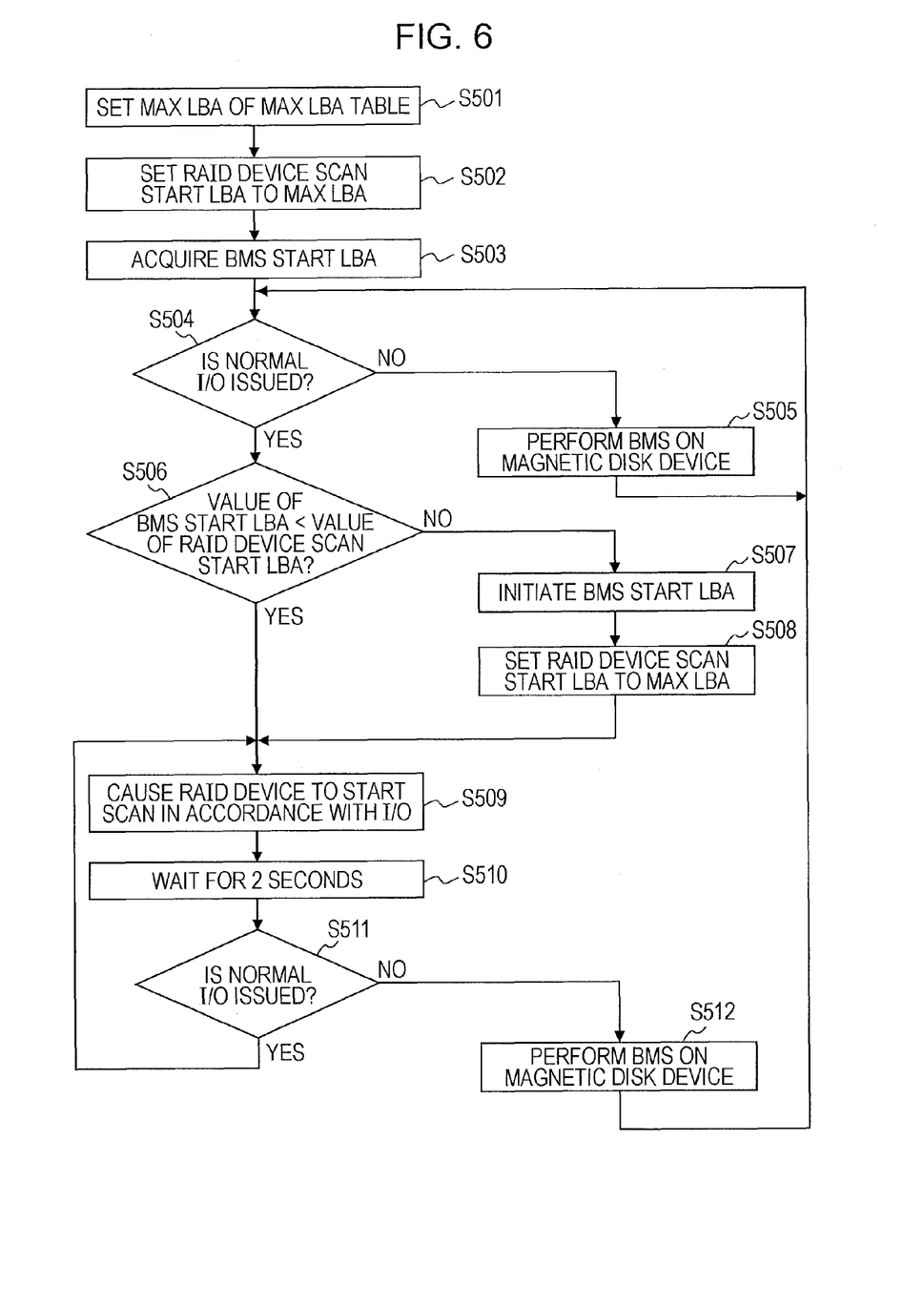
FIG. 6 is a flowchart of a disk patrol process according to the embodiment.

FIG. 6 is a flowchart of the disk patrol process according to the embodiment. In operation S501, the RAID controller 211 sets the MAX LBA of the MAX LBA table to the maximum value of the LBAs of the magnetic disk device 301.

In operation S502, the RAID controller 211 sets the RAID device scan start LBA to the MAX LBA. In operation S503, the RAID controller 211 acquires the BMS start LBA from the magnetic disk device 301.

In operation S504, the RAID controller 211 determines whether or not a normal I/O (request to write data or request to read data) is issued to the magnetic disk device 301. Specifically, the RAID device 201 receives, from the host 102, a request to write data or a request to read data, and transmits, to the magnetic disk device 301, the request to write the data or the request to read the data. The magnetic disk device 301 writes the data or reads the data. When the magnetic disk device 301 completes writing the data or reading the data, the magnetic disk device 301 notifies (responds) the RAID device 201 that the magnetic disk device 301 has completed writing the data or reading the data. When the magnetic disk device 301 does not complete writing the data or reading the data, or when the RAID controller 211 waits for a response to the request to write the data or the request to read the data, the RAID controller 211 determines that the normal I/O is issued to the magnetic disk device 301.

When the normal I/O is issued, the process proceeds to operation S506. When the normal I/O is not issued, the process proceeds to operation S505. In operation S505, the controller control unit 313 performs the BMS.

In the BMS, the magnetic disk is verified during a time period for which the magnetic disk device 301 is idle. The BMS includes a pre-scan function and a background media scan function.

The pre-scan function is performed to verify all user regions of the magnetic disk 322 immediately after power is supplied to the magnetic disk device 301. The background media scan function is performed when the pre-scan function is not performed. The background media scan function is performed to verify all the user regions of the magnetic disk 322 again after a predetermined time. The BMS is described later in detail.

In operation S506, the RAID controller 211 determines whether or not a value of the BMS start LBA is smaller than a value of the RAID device scan start LBA. When the value of the BMS start LBA is smaller than the value of the RAID device scan start LBA, the process proceeds to operation S509. When the value of the BMS start LBA is equal to or larger than the value of the RAID device scan start LBA, the process proceeds to operation S507.

The fact that the value of the BMS start LBA is equal to or larger than the value of the RAID device scan start LBA means that all the regions of the magnetic disk 322 have been scanned by the RAID device 201 and by performing the BMS.

In operation S507, the RAID controller 211 initiates the BMS start LBA. Specifically, the RAID controller 211 set the value of the BMS start LBA to the minimum value of the LBAs of the magnetic disk 322. In operation S508, the RAID controller 211 sets the RAID device scan start LBA to the MAX LBA. In addition, the RAID controller 211 adds 1 to the number of times of scan.

In operation S509, the RAID controller 211 performs scan in accordance with the I/O. The scan that is performed in accordance with the I/O is described later in detail. In operation S510, the RAID controller 211 waits for 2 seconds. In the embodiment, the waiting time is 2 seconds. However, the waiting time is not limited to 2 seconds and may be changed.

In operation S511, the RAID controller 211 determines whether or not a normal I/O is issued to the magnetic disk device 301. When the normal I/O is issued, the process returns to operation S509. When the normal I/O is not issued, the process proceeds to operation S512. In operation S512, the controller control unit 313 performs the BMS.

Figure 7:
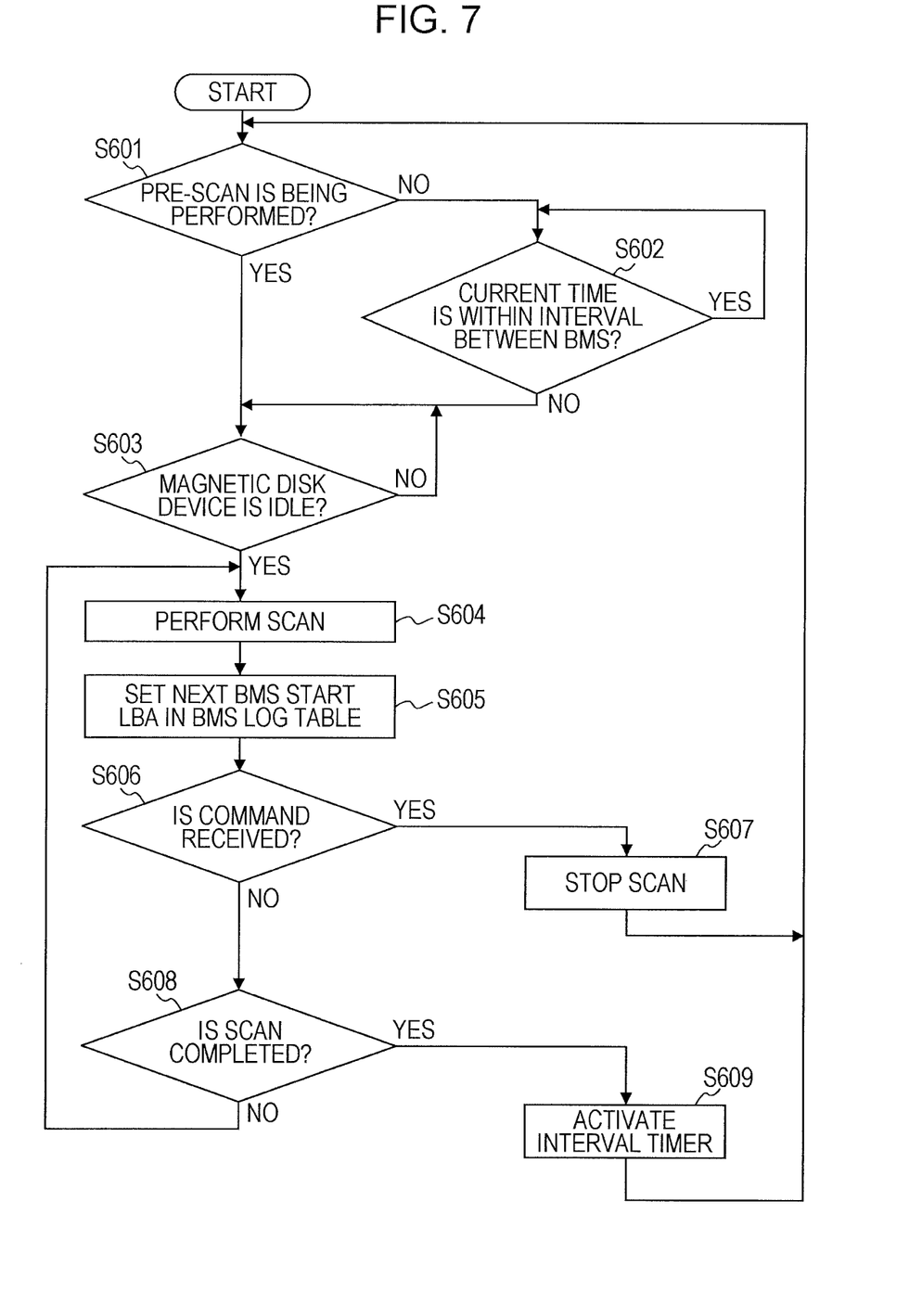
FIG. 7 is a detailed flowchart of a BMS process.

FIG. 7 is a detailed flowchart of the BMS process (operations S507 and S512). In operation S601, the controller control unit 313 determines whether or not the pre-scan function is being performed by the magnetic disk device 301. When the pre-scan function is being performed, the process proceeds to operation S603. When the pre-scan function is not being performed, the process proceeds to operation S602.

In operation S602, the controller control unit 313 determines whether or not a current time is within an interval between the BMS to be performed on the magnetic disk device 301. When the current time is within the interval between the BMS, the process returns to operation S602. When the current time is not within the interval between the BMS, the process proceeds to operation S603. Whether or not the current time is within the interval between the BMS is determined by determining whether or not a predetermined time (for example, 24 hours) elapses after an interval timer (described later) is activated. For example, when the predetermined time elapses after the interval timer is activated, the controller control unit 313 determines that the current time is not within the interval between the BMS.

In operation S603, the controller 313 determines whether or not the magnetic disk device 301 is idle. When the magnetic disk device 301 is idle, the process proceeds to operation S604. When the magnetic disk device 301 is not idle, the process returns to operation S603. Whether or not the magnetic disk device 301 is idle is determined by determining whether or not the RAID device 201 provides the request to write data or the request to read data in response to a request provided from the host 102 during a time period from a time earlier by a predetermined time (for example, 500 milliseconds) than the current time to the current time, for example. When the RAID device 201 does not provide the request to write or the request to read data in response to the request provided from the host 102 during the time period from the time earlier by the predetermined time than the current time to the current time, the controller 313 determines that the magnetic disk device 301 is idle.

In operation S604, the controller control unit 313 scans a predetermined number of blocks of the magnetic disk 322 in a direction (in which the value of the LBA increases) in ascending order of the LBAs from the BMS start LBA. The predetermined number of blocks is specified by a user in advance. In the scan process, data is read from the predetermined number of the blocks in the direction in ascending order of the LBAs from the BMS start LBA, and a process is performed to determine whether or not an error exists.

In operation S605, the controller control unit 313 adds the predetermined number of blocks to the BMS start LBA, and describes a value obtained by adding the predetermined number of blocks to the BMS start LBA in the BMS log table as the next BMS start LBA. Thus, the next BMS start LBA is an LBA that is a start point at which the next scan starts to be performed.

In operation S606, the controller control unit 313 determines whether or not the controller control unit 313 receives a command to read or write data. When the controller control unit 313 receives the command, the process proceeds to operation S607. When the controller control unit 313 does not receive the command, the process proceeds to operation S608. In operation S607, the controller control unit 313 stops the scan.

In operation S608, the controller control unit 313 determines whether or not the scan is completed. When the scan is completed, the process proceeds to operation S609. When the scan is not completed, the process returns to operation S604. Whether or not the scan is completed is determined by determining whether or not the value of the BMS start LBA is equal to or larger than the maximum value of the LBAs of the magnetic disk 322. For example, when the value of the BMS start LBA is equal to or larger than the maximum value of the LBAs of the magnetic disk 322, the controller control unit 313 determines that the scan is completed. In operation S609, the controller control unit 313 activates the interval timer and counts a time after the completion of the scan.

Figure 8:
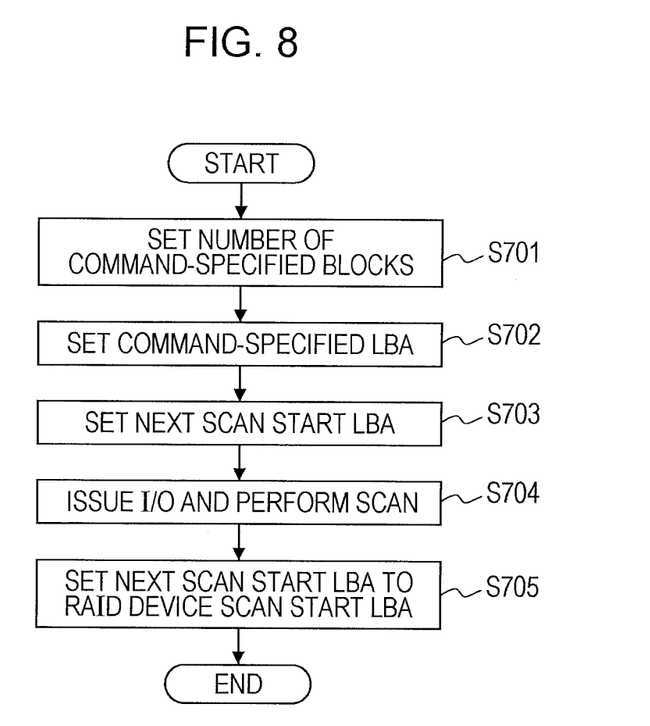
FIG. 8 is a detailed flowchart of a scan process to be performed in accordance with an I/O.

FIG. 8 is a detailed flowchart of the scan process (operation S509). In operation S701, the RAID controller 211 sets the command-specified number of blocks. In this case, the command-specified number of blocks is set to a predetermined value. In operation S702, the RAID controller 211 sets the command-specified LBA. In this case, the command-specified LBA is set to a value of (RAID device scan start LBA−command-specified number of blocks+1).

In operation S703, the RAID controller 211 sets the next scan start LBA. In this case, the next scan start LBA is set to a value of (RAID device scan start LBA−command-specified number of blocks+1). In operation S704, the RAID controller 211 instructs the I/O controller 213 to issue the I/O (verify command). The I/O controller 213 transmits the verify command to the magnetic disk device 301. The verify command includes the command-specified number of blocks and the command-specified LBA. The controller control unit 313 scans the command-specified number of blocks of the magnetic disk 322 in a direction in ascending order of the LBAs from the command-specified LBA. In the scan process, data is read from the magnetic disk 322, and the process is performed to whether or not an error exists, for example.

In operation S705, the RAID controller 211 sets the next scan start LBA to the RAID device scan start LBA. Specifically, a value that is obtained by subtracting the command-specified number of blocks from the value of the RAID device scan start LBA is the new RAID device scan start LBA. The value of the LBA that is the start point at which the next scan starts to be performed is smaller than the value of the LBA that is the start point at which the current scan starts to be performed. In the scan process that is performed in accordance with the I/O, a region in which the scan is performed in a direction (in which the value of the LBA is reduced) in descending order of the LBAs is increased.

Figure 9:
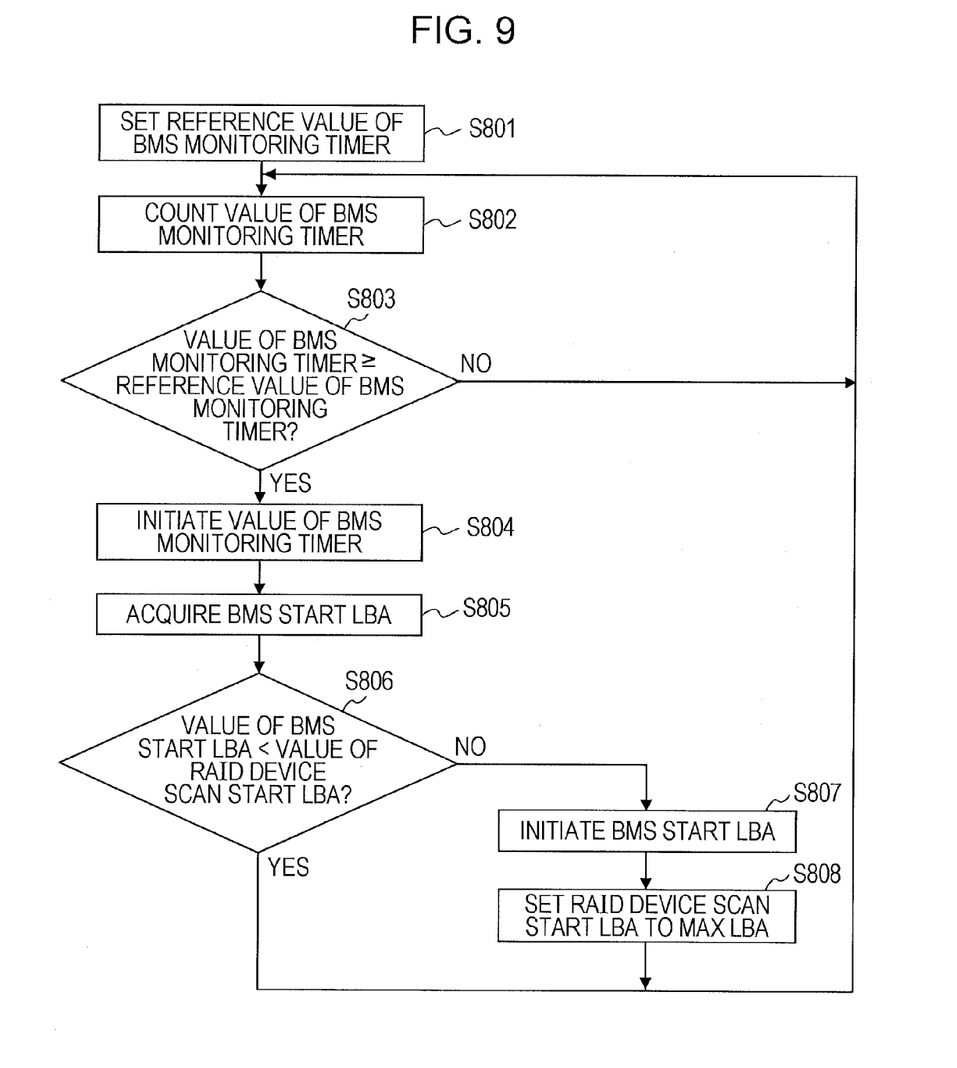
FIG. 9 is a flowchart of a BMS monitoring process according to the embodiment.

FIG. 9 is a flowchart of a BMS monitoring process according to the embodiment. In operation S801, the controller control unit 313 sets a reference value of a BMS monitoring timer. For example, 1 hour is set as the reference value of the BMS monitoring timer. In operation S802, the BMS monitoring timer that is arranged in the controller control unit 313 counts a value of the BMS monitoring timer.

In operation S803, the controller control unit 313 determines whether or not the value of the BMS monitoring timer is equal to or larger than the reference value of the BMS monitoring timer. When the value of the BMS monitoring timer is equal to or larger than the reference value of the BMS monitoring timer, the process proceeds to operation S804. When the value of the BMS monitoring timer is smaller than the reference value of the BMS monitoring timer, the process returns to operation S802.

In operation S804, the controller control unit 313 initiates the value of the BMS monitoring timer. In operation S805, the controller control unit 313 acquires the BMS start LBA.

In operation S806, the controller control unit 313 determines whether or not the value of the BMS start LBA is smaller than the value of the RAID device scan start LBA. When the value of the BMS start LBA is smaller than the value of the RAID device scan start LBA, the process returns to operation S802. When the value of the BMS start LBA is equal to or larger than the value of the RAID device scan start LBA, the process proceeds to operation S807.

In operation S807, the controller control unit 313 initiates the BMS start LBA. Specifically, the controller control unit 313 sets the BMS start LBA to the minimum value of the LBAs of the magnetic disk 322. In operation S808, the controller control unit 313 transmits, to the RAID device 201, an instruction to set the RAID device scan start LBA to the MAX LBA. The RAID controller 211 sets the RAID device scan start LBA to the MAX LBA. In addition, the RAID controller 211 adds 1 to the number of times of the scan.

Figure 10:
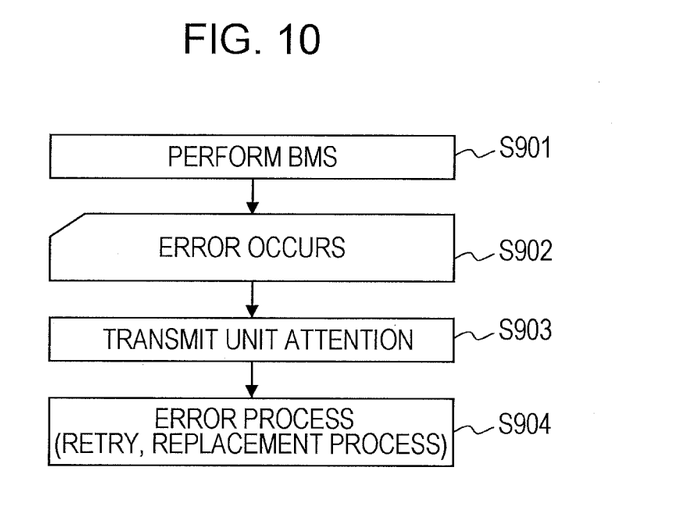
FIG. 10 is a flowchart of a process to be performed when an error occurs during the BMS.

Next, a process (error process) that is performed when an error is detected during the BMS, and a process (error process) that is performed when an error is detected during the scan performed by the RAID device, are described. FIG. 10 is a flowchart of the error process to be performed when an error is detected during the BMS. In operation S901, the controller control unit 313 performs the BMS. In operation S902, an error is detected.

In operation S903, the controller control unit 313 transmits a unit attention to the RAID device 201. The unit attention is a signal that includes: information indicating that the error occurs; and information that specifies a location at which the error occurs in the magnetic disk 322. In operation 5904, the RAID controller 211 performs the error process on the magnetic disk 322. For example, in the error process, a retry, the replacement process or the like is performed.

Figure 11:
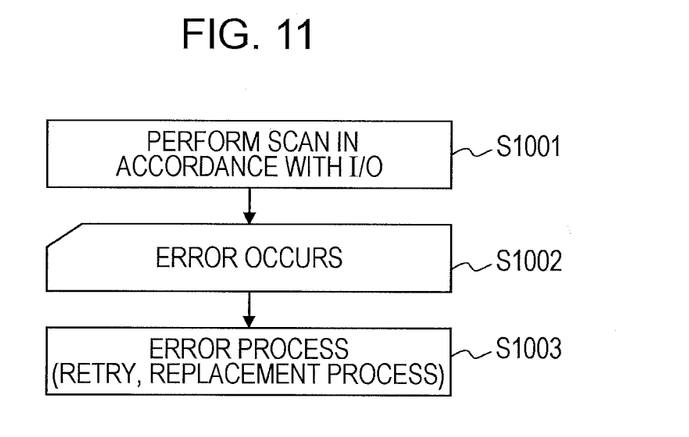
FIG. 11 is a flowchart of a process to be performed when an error occurs during scan performed by a RAID device.

FIG. 11 is a flowchart of the error process to be performed during the scan performed by the RAID device 201. In operation S1001, the RAID controller 211 performs the scan in accordance with the I/O (the issuance of the verify command). In operation S1002, an error is detected. The RAID controller 211 receives, as a response to the verify command, an error signal that indicates that the error is detected from the magnetic disk 322.

In operation S1003, the RAID controller 211 performs the error process on the magnetic disk 322. In the RAID system according to the embodiment, since the scan is performed by the RAID device and the BMS is performed by the magnetic disk device, a time period for checking the magnetic disk can be reduced.

In the aforementioned embodiment, the RAID device 201 scans the magnetic disk 322 in the direction in descending order of the LBAs of the magnetic disk 322, and the magnetic disk device 301 scans the magnetic disk 322 in the direction in ascending order of the LBAs of the magnetic disk 322. In another embodiment, the RAID device 201 may scan the magnetic disk 322 in the direction in ascending order of the LBAs of the magnetic disk 322, and the magnetic disk device 301 may scan the magnetic disk 322 in the direction in descending order of the LBAs of the magnetic disk 322. In this case, when the normal I/O is issued to the magnetic disk device 301, the RAID controller 211 compares the BMS start LBA with the RAID device scan start LBA. When the value of the RAID device scan start LBA is equal to or larger than the value of the BMS start LBA, the RAID controller 211 sets the BMS start LBA to the MAX LBA, and initiates the RAID device scan start LBA. In addition, the controller control unit 313 compares the BMS start LBA with the RAID device scan start LBA at intervals of a predetermined time. When the value of the RAID device scan start LBA is equal to or larger than the value of the BMS start LBA, the controller control unit 313 sets the BMS start LBA to the MAX LBA and initiates the RAID device scan start LBA.

The invention is not limited to the aforementioned embodiments and may be applied to other various configurations and shapes without departing from the gist of the invention.

The device according to the embodiment may check the storage device for a short time.

As mentioned above, the present invention has been specifically described for better understanding of the embodiments thereof and the above description does not limit other aspects of the invention. Therefore, the present invention may be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage system comprising:
    a storage device that includes a storage medium capable of storing data; and
    a control device that is connected to an upstream-side device, scans the storage device, writes the data in the storage device on the basis of a request provided from the upstream-side device, and reads the data from the storage device on the basis of a request provided from the upstream-side device;
    wherein the control device determines whether or not the data is being written in or read from the storage device on the basis of the interested request provided from the upstream-side device, and when the data is being written or read, scans the storage medium at intervals of a first time in a first direction that is either a direction in ascending order of logical block addresses of the storage medium or a direction in descending order of the logical block addresses of the storage medium, and the storage device determines whether or not the data is written or read on the basis of the interested request provided from the upstream-side device during a time period from a time earlier by a second time than a current time to the current time, and when the data is not written and read during the time period, scans the storage medium in a second direction that is the reversed direction of the first direction.

2. The storage system according to claim 1, wherein when the data is being written into or read from the storage device on the basis of the interested request provided from the upstream-side device, and the first direction is the direction in descending order of the logical block addresses, the control device compares a first logical block address indicating a range scanned by the control device with a second logical block address indicating a range scanned by the storage device, and when a value of the second logical block address is equal to or larger than a value of the first logical block address, the control device sets the first logical block address to the maximum value of the logical block addresses of the storage medium and sets the second logical block address to the minimum value of the logical block addresses of the storage medium.

3. The storage system according to claim 2, wherein when the first direction is the direction in descending order of the logical block addresses, the storage device compares the first logical block address with the second logical block address at intervals of a third time, and when the value of the second logical block address is equal to or larger than the value of the first logical block address, the storage device sets the first block address to the maximum value of the logical block addresses of the storage medium and sets the second block address to the minimum value of the logical block addresses of the storage medium.

4. The storage system according to claim 1, wherein when the data is being written in or read from the storage device on the basis of the interested request provided from the upstream-side device, and the first direction is the direction in ascending order of the logical block addresses, the control device compares a first logical block address indicating a range scanned by the control device with a second logical block address indicating a range scanned by the storage device, and when a value of the first logical block address is equal to or larger than a value of the second logical block address, the control device sets the second block address to the maximum value of the logical block addresses of the storage medium and sets the first logical block address to the minimum value of the logical block addresses of the storage medium.

5. The storage system according to claim 4, wherein when the first direction is the direction in ascending order of the logical block addresses, the storage device compares the first logical block address with the second logical block address at intervals of a third time, and when the value of the first logical block address is equal to or larger than the value of the second logical block address, the storage device sets the second logical block address to the maximum value of the logical block addresses of the storage medium and sets the first logical block address to the minimum value of the logical block addresses of the storage medium.

6. The storage system according to claims 1, wherein when the storage device detects an error, the storage device transmits, to the control device, an error signal that indicates that the error occurs.

7. A control device that is connected to an upstream-side device and a storage device that includes a storage medium capable of storing data, comprising:

a controller configured to control the storage device based on a request provided from the upstream-side device and to determine whether or not the data is being written in the storage device on the basis of a request provided from the upstream-side device or is being read from the storage device on the basis of a request provided from the upstream-side device,
wherein when the data is being written or read, the controller scan the storage medium at intervals of a first time in a first direction that is either a direction in ascending order of logical block addresses of the storage medium or a direction in descending order of the logical block addresses of the storage medium, when the data is being written in or read from the storage device on the basis of the interested request provided from the upstream-side device, and the first direction is the direction in descending order of the logical block addresses, the controller compares a first logical block address indicating a range scanned by the control device with a second logical block address indicating a range scanned by the storage device, and when a value of the second logical block address is equal to or larger than a value of the first logical block address, the controller sets the first logical block address to the maximum value of the logical block addresses of the storage medium and sets the second logical block address to the minimum value of the logical block addresses of the storage medium.

8. The control device according to claim 7, wherein when the data is being written in or read from the storage device on the basis of the interested request provided from the upstream-side device, and the first direction is the direction in ascending order of the logical block addresses, the controller compares the first logical block address indicating the range scanned by the control device with the second logical block address indicating the range scanned by the storage device, and when the value of the first logical block address is equal to or larger than the value of the second logical block address, the controller sets the second logical block address to the maximum value of the logical block addresses of the storage medium and sets the first logical block address to the minimum value of the logical block addresses of the storage medium.

9. A storage device that includes a storage medium capable of storing data and is connected to a control device that is connected to an upstream-side device, the storage device comprising:

a controller configured to control to write into and read from the storage medium and to scan, in accordance with an instruction provided by the control device, the storage medium in a first direction that is either a direction in ascending order of logical block addresses of the storage medium or a direction in descending order of the logical block addresses of the storage medium;
wherein the controller determines whether or not the data is written or read on the basis of a request provided from the upstream-side device during a time period from a time earlier by a first time than a current time to the current time, and when the data is not written and read during the time period, the controller scans the storage medium in a second direction that is the reversed direction of the first direction.

10. The storage device according to claim 9, wherein when the first direction is the direction in descending order of the logical block addresses, the controller compares a first logical block address indicating a range scanned in accordance with the instruction provided by the control device with a second logical block address indicating a range scanned by the storage device at intervals of a predetermined time, and when a value of the second logical block address is equal to or larger than a value of the first logical block address, the controller sets the first logical block address to the maximum value of the logical block addresses of the storage medium and sets the second logical block address to the minimum value of the logical block addresses of the storage medium.

11. The storage device according to claim 9,
wherein when the first direction is the direction in ascending order of the logical block addresses, the controller compares a first logical block address indicating a range scanned in accordance with the instruction provided by the control device with a second logical block address indicating a range scanned by the storage device at intervals of a predetermined time, and when a value of the first logical block address is equal to or larger than a value of the second logical block address, the controller sets the second logical block address to the maximum value of the logical block addresses of the storage medium and sets the first logical block address to the minimum value of the logical block addresses of the storage medium.

* * * * *